June 18, 1963

D. W. HARLING 3,094,286

POST TOP MOUNTED LIGHTING UNIT

Filed Sept. 25, 1959

INVENTOR.
Donald W. Harling
BY
Andrus & Starke
Attorneys

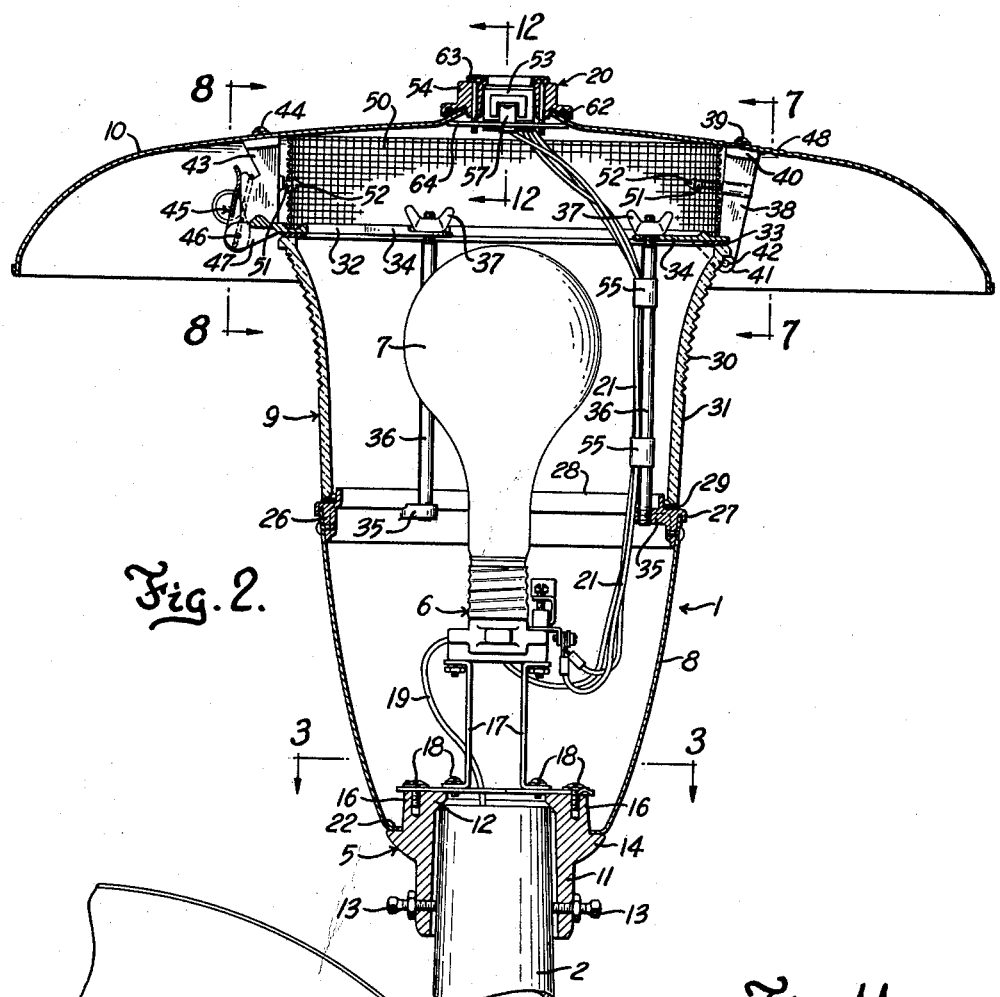

June 18, 1963 D. W. HARLING 3,094,286
POST TOP MOUNTED LIGHTING UNIT
Filed Sept. 25, 1959 5 Sheets-Sheet 3
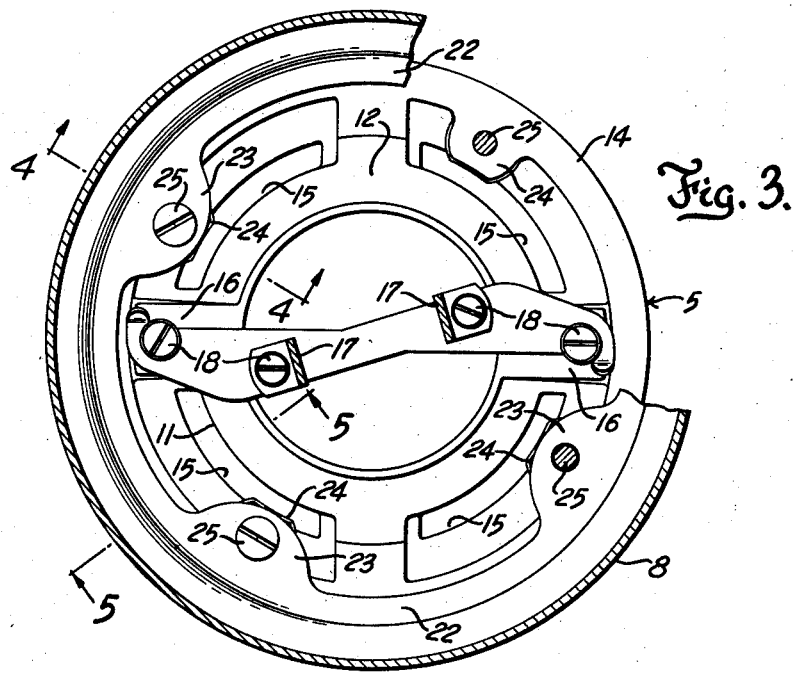
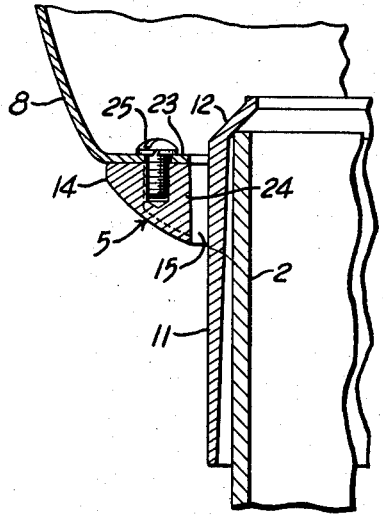
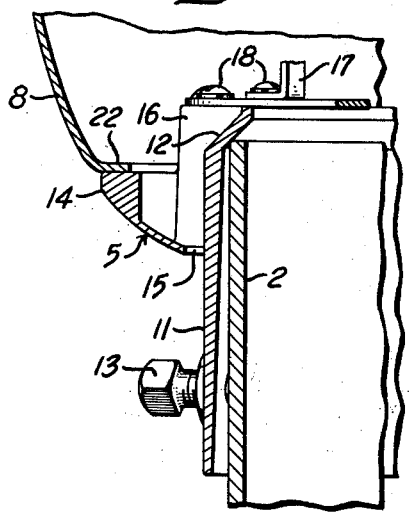
INVENTOR.
Donald W. Harling
BY
*Andrus & Starke*
Attorneys June 18, 1963 D. W. HARLING 3,094,286
POST TOP MOUNTED LIGHTING UNIT
Filed Sept. 25, 1959 5 Sheets-Sheet 4
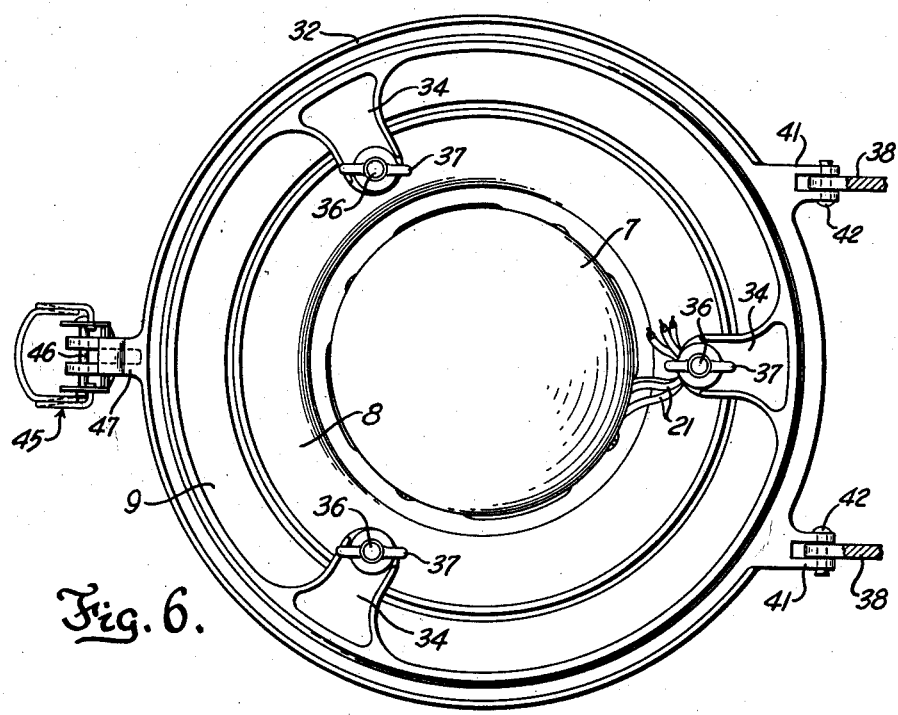
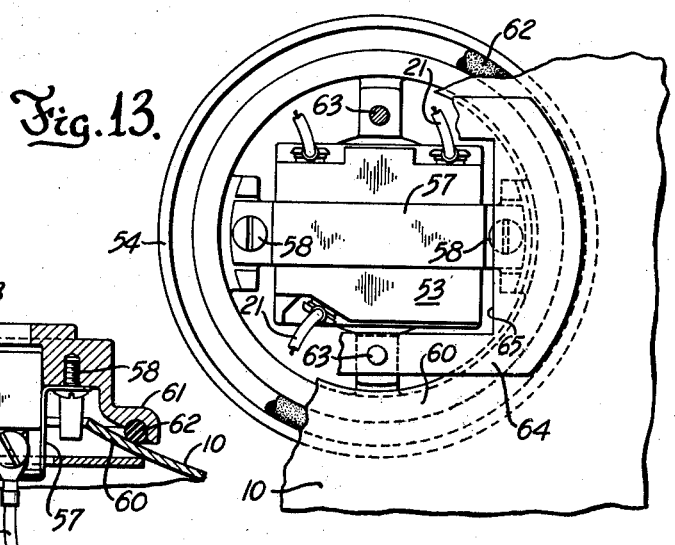
INVENTOR.
Donald W. Harling June 18, 1963  D. W. HARLING  3,094,286
POST TOP MOUNTED LIGHTING UNIT
Filed Sept. 25, 1959  5 Sheets-Sheet 5
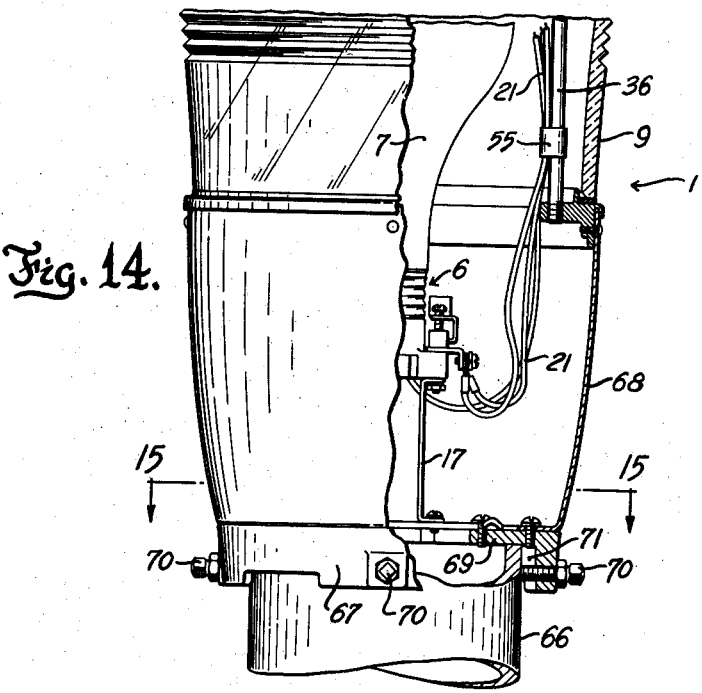
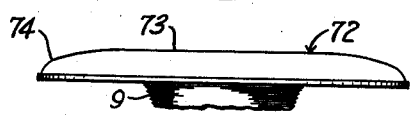
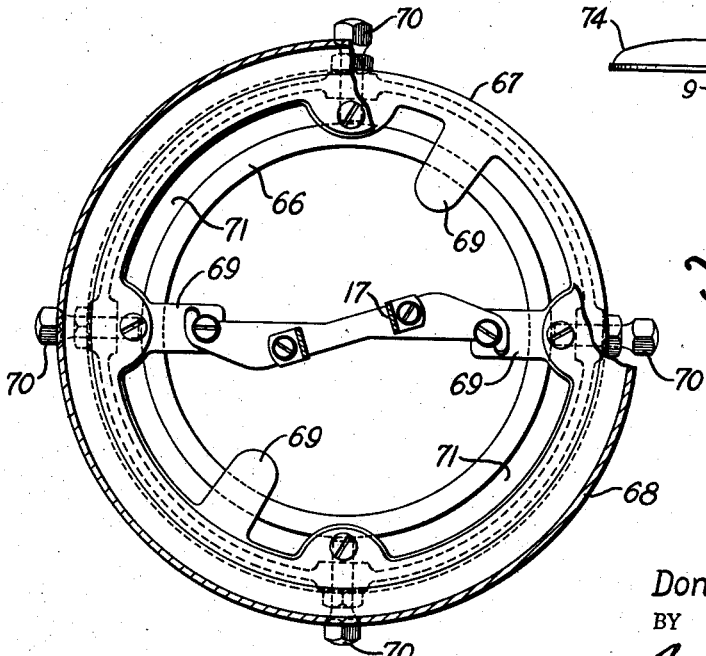
INVENTOR.
Donald W. Harling
BY
*Andrus & Starke*
Attorneys United States Patent Office 3,094,286
Patented June 18, 1963

3,094,286
POST TOP MOUNTED LIGHTING UNIT
Donald W. Harling, Milwaukee, Wis., assignor to Mc-Graw-Edison Company, Milwaukee, Wis., a corporation of Delaware
Filed Sept. 25, 1959, Ser. No. 842,275
11 Claims. (Cl. 240—25)

This invention relates to a post top mounted lighting unit for street and roadway lighting as well as other area lighting such as parking lots and patios.

Modern street, roadway and similar large area lighting units customarily mount the lighting unit on the end of a horizontal pipe bracket which is carried at the upper end of a suitable vertical mounting pole. Although the illuminating characteristics of this form are exceptionally satisfactory, the installation does not always blend with the surrounding architecture and terrain.

Where the horizontal mount was considered unacceptable, ornamental post top luminaires which more esthetically conform to the adjacent surroundings have been suggested. Generally, common commercial units consist primarily of a glass globe and glass canopy. Although such units are design to blend in with the surrounding area, the illuminating characteristics do not approach the efficiency and effectiveness of the side mounted units. Very little or no light control is designed into the units and a substantial amount of the light is directed above the horizontal and does not contribute to the illumination of the street surface. Further, the distribution of the light is relatively uneven and only relatively small areas are adequately illuminated.

The present invention provides a post top lighting unit which includes refractor means controlling the distribution of the light and illuminates relatively large areas. The lighting unit of the present invention provides excellent utilization of the beam candle power and provides a high degree of evenness of lighting. The unit is protected from birds and other foreign elements to provide a long life with a minimum of service requirements.

In accordance with the present invention, an adaptor is releasably secured to the upper end of the mounting pole and carries, in stacked relation, a separate or integral tubular supporting base and a ring-like refractor such as disclosed in the copending patent application of Phillip B. Clark and Donald W. Harling entitled "Luminaire and Refractor Therefor" which was filed in the United States Patent Office on April 30, 1956 with Serial No. 581,739, now abandoned with a continuation of the application being filed May 5, 1959, Serial No. 811,036, now Patent No. 3,062,953. A dished reflector having a greater diameter than the refractor is mounted on the upper end of the refractor and in vertically spaced relation to the refractor. The reflector is inverted and extends downwardly below the upper edge of the refractor and serves to redirect the upwardly directed light downwardly below the horizontal. A suitable selection of the refractor in accordance with the principles set forth in the previously referred to copending application in combination with the dished reflector establishes an efficient post top luminaire having a light controlling optical system to provide an even distribution of light.

In accordance with another aspect of the present invention, the dished reflector is provided with a series of adjacent circular or circumferential flutes which evenly distribute the upward reflected light over the top of the refractor and then into angles below the horizontal. The combination of a tubular refractor and an inverted dish-shaped reflector may cause a bright ring within the illuminated area because of the concentration of light emitted from the upper end of the refractor and reflected downwardly by the reflector. The fluted construction of the present invention prevents establishment of the bright ring in the illumination pattern and increases the eveness of illumiation.

A screen is mounted between the upper edge of the refractor and the cover or reflector to prevent entrance of birds or the like.

In accordance with still another effect of the present invention, openings are provided adjacent the lower most end of the unit externally or exteriorly of the mounting post. The vertical openings allow small insects, which can enter into the lighting unit through the screen and the like and which are destroyed by the heat, to fall from the lighting unit and thereby avoids the necessity of periodically removing the lighting unit from the pole top to clean out the insects and the like. Further, the opening in the bottom portion of the unit allows air to rise upwardly through the lighting unit and through the screened opening incident the chimney effect of the tubular lighting unit. The continuously moving air cools the refractor and eliminates breakage due to contact with cold rain and the like.

In accordance with still another aspect of this invention, the refractor is clamped in position by an upper mounting ring encircling the upper end of the refractor. The reflector is hinged to the mounting ring and releasably secured by latch device. The screen is secured to the cover. Consequently whenever it is necessary to service the lighting unit, the operator can simply and quickly release the latch and swing the reflector and attached screen to the vertical position to allow entrance into the light unit.

Where it is desired to automatically turn the lighting unit on and off in response to solar lighting conditions, a photoelectric control is adapted to be secured within a central opening especially provided in the center of the reflector. The top central mounting of the photoelectric control allows accurate and most advantageous orientation of the photoelectric control in accordance with illumination conditions. This placement of the photoelectric control is also particularly desirable from the standpoint of maintaining a modern and neat appearing unit. The photoelectric control is connected into circuit by leads which extend downwardly through the refractor adjacent the hinge mounted side of the reflector. Consequently, the reflector may be swung open without in any way disturbing the photoelectric control.

The post top lighting unit of the present invention particularly provides a controlled light distribution unit having excellent styling and appearance. Consequently the unit is readily adapted for street and other area lighting purposes. The lighting unit is efficient, has a long life, and is also readily serviced and is therefore consequently well adapted for commercial production.

The drawings furnished herewith illustrate the best mode presently contemplated for carrying out the invention.

In the drawings:

FIG. 2 is an enlarged vertical section through the lighting unit shown in FIG. 1;

FIG. 3 is an enlarged horizontal section taken on line 3—3 of FIG. 2 showing the pole top adaptor shown in FIG. 2;

FIG. 4 is an enlarged fragmentary view taken on the line 4—4 of FIG. 3;

FIG. 5 is an enlarged fragmentary view taken on the line 5—5 of FIG. 3;

FIG. 6 is a top view with the reflector and screen, shown in FIG. 2, removed;

Figure 7:
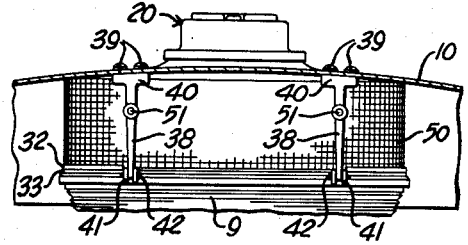
FIG. 7 is an enlarged fragmentary view taken on line
Figure 8:
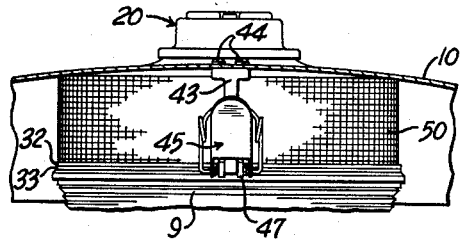
Figure 9:
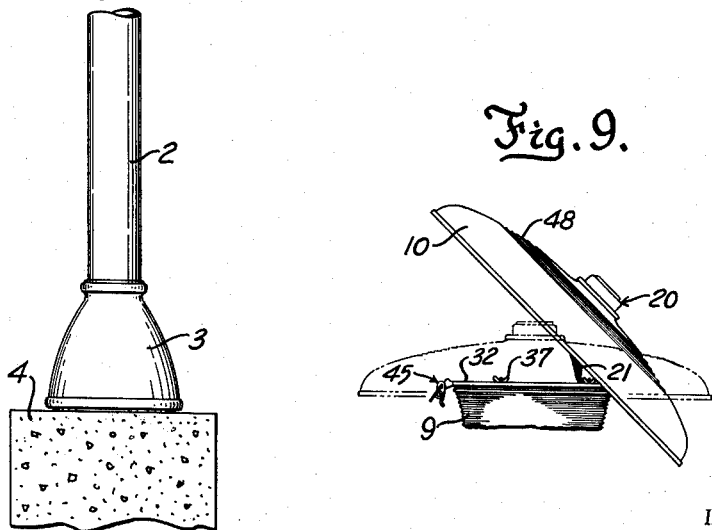

7—7 of FIG. 2 illustrating the hinge construction for the reflector;

FIG. 8 is an enlarged view similar to FIG. 7 taken on line 8—8 of FIG. 2 illustrating the latch for the reflector;

FIG. 9 is a view showing the reflector partially swung open in full line with the normal closed positions shown in phantom;

FIG. 10 is a fragmentary plan view of the reflector showing the circular flutes;

FIG. 11 is a sectional view taken on line 11—11 of FIG. 10 showing a cross-sectional view of the fluted portion of the reflector;

FIG. 12 is an enlarged fragmentary view taken on line 12—12 of FIG. 2 showing the photoelectric control assembly;

FIG. 13 is a bottom view of FIG. 12;

FIG. 14 is an enlarged fragmentary view showing a large pole top mounting unit constructed in accordance with the present invention;

FIG. 15 is a view taken on line 15—15 of FIG. 14 illustrating the details of the post top adaptor shown in FIG. 14; and FIG. 16 is a fragmentary side elevational view of an alternative embodiment of the invention with a modified reflector.

Figure 1:
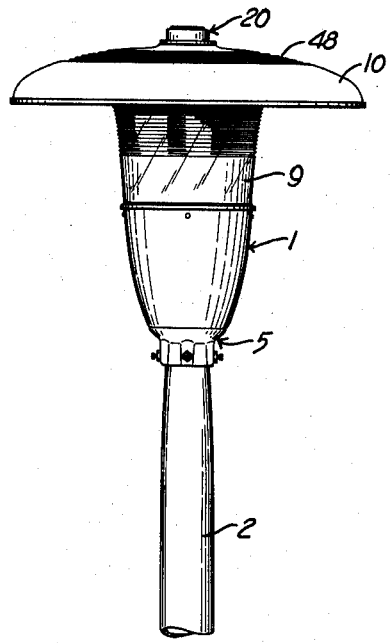
FIG. 1 is an elevational view of a post top lighting unit constructed in accordance with the present invention.

Referring to the drawings and particularly to FIG. 1, a pole top mounted lighting unit or luminaire 1 is illustrated secured to the upper end of a vertical supporting pole 2 to dispose the luminaire 1 at a predetermined height for illuminating a particular surrounded area. A pedestal 3 is mounted upon a suitable concrete foundation 4 and supports the vertical pole 2. The pole 2 and pedestal 3 are hollow metallic members, conventionally formed of aluminum or some similar metal, which is readily adapted to modern styling.

The luminaire 1 is normally connected in the circuit of a suitable underground wiring system and the vertical pole and pedestal 3 constitute a housing for the power lines, not shown, from the source of power to the luminaire 1.

Referring particularly to FIGS. 1 and 2 of the drawing, the illustrated luminaire 1 generally includes a pole top adaptor 5 which is rigidly secured to the upper end of the vertical pole 2. A standard lamp socket 6 is mounted on the upper surface of the pole top adaptor 5 and supports a suitable light source such as an incandescent bulb or a gaseous discharge bulb 7. A tubular sheet metal base 8 is secured to the pole top adaptor 5 and extends upwardly concentrically above the lamp socket 6 and the lower portion of the lamp bulb 7. A tubular refractor 9 is mounted on the upper end of the base 8 and extends upwardly generally coextensively with the bulb 7. The refractor 9 serves to diffuse the light in a manner more fully described hereinafter. A hood and reflector 10 is secured in overlying relation to the upper end of the refractor 9. The reflector 10 serves to redirect and evenly distribute all the vertically directed light from the bulb 7 downwardly toward the adjacent area to be illuminated.

Referring particularly to FIGS. 2–5, the pole top adaptor 5 is illustrated as of an integral die case construction including a tubular hub 11 having an inner diameter slightly larger than the diameter of the top portion of the pole 2. The upper end of the hub 11 tapers inwardly to define an inner shoulder 12 which rests upon the upper end of the pole 2 with the luminaire 1 mounted upon the pole 2. A series of circumferentially distributed locking screws 13 pass through tapped openings in the lower side wall portion of hub 11 and bear against the adjacent pole 2 to rigidly interlock the luminaire to the upper end of the pole. A mounting flange 14 is integrally cast to the hub 11 generally intermediate the vertical dimension of the hub. The mounting flange 14 is generally arcuately shaped and flares upwardly and outwardly from adjacent the hub 11. As shown most clearly in FIGS. 3–5 a plurality of circumferential slots 15 are formed in the lower end of the flange 14 immediately adjacent the outer surface of the hub 11. As more fully described hereinafter, the slots 15 contiguous to hub 11 allow bugs and insects which enter into the luminaire 1 to fall downwardly and out of the luminaire. The slots 15 also establish a chimney effect which causes air to rise upwardly through the luminaire.

A pair of upstanding mounting ledges 16 are integrally cast in the hub 11 and flange 14 on diametrically opposite sides of the adaptor. The lamp socket 6 includes suitable spacing members 17 which are secured to the ledge 16 by small attachment screws 18.

Referring to FIG. 2, the incoming power lines 19 are secured to the socket member 6 and project downwardly through the luminaire 1 and the vertical pole 2 into the power circuit, not shown. A photoelectric control 20 is mounted on the reflector 10 and connected in circuit with the power lines 19 and the lamp socket 6 by suitable control lines 21. The photoelectric control 20 operates to automatically open and break the power circuit to the bulb 7 in response to solar illumination.

Referring particularly to FIGS. 2–4, the illustrated base 8 is a separate tubular generally cone-shaped metallic shell which tapers slightly upwardly and outwardly from the mounting flange 14 of pole adaptor 5. The lower end of the base 8 includes an inwardly turned lip 22 which is adapted to rest upon the outer portion of the mounting flange 14. A series of aligned aperture lugs 23 on the base 8 and mounting bosses 24 on the mounting flange 14 are aligned and suitable attachment screws 25 pass through lug 23 and thread into the suitably tapped openings in mounting bosses 24 to rigidly support the base 8 upon adaptor 5. Base 8 extends concentrically upwardly and outwardly about the lamp socket 6 and the lower portion of the lamp 7 to provide a smooth, modern luminaire construction.

A refractor mounting ring 26 is secured to the upper end of the base 8 by a plurality of circumferentially distributed attachment screws which pass through suitable openings in the side wall of the base 8 and thread into correspondingly tapped openings in the mounting ring 26. The refractor mounting ring 26 includes an outer downwardly projecting lip 27 defining a recess which mates with the upper edge of the base 8 to rigidly support the mounting ring. The mounting ring 26 extends radially inwardly of the base 8 and constitutes a supporting ledge upon which the lower edge of refractor 9 rests. An upstanding annular projection 28 is formed on the upper surface of the mounting ring 26 and serves to accurately locate the refractor 9 upon the ring 26.

A gasket 29 is disposed between the mounting ring 26 and the lower edge of refractor 9. Gasket 29 is preferably a water repellant material such as Dacron felt to establish an insect and water-tight joint.

The refractor 9 is illustrated as a single-piece, open-ended unit of suitable glass extending coaxially about the lamp bulb 7. An upper reflecting prismatic section 30 and a lower non-prismatic portion 31 is formed in the refractor 9 to establish a controlled and predesigned lighting pattern. The illustrated refractor 9 is generally similar to the refractor disclosed in the previously referred to co-pending application of Clark and Harling to which reference may be made for a more detailed description of the refractor. As more fully set forth therein, the effective center of the light source is generally coincident with the focal center of the prismatic refractor 9. The prismatic configuration designed into the refractor may be arranged to provide any desired distribution pattern of the light from the luminaire 1. The refractor 9 thus permits controlled vertical and lateral light distribution and increases the utilization of the light from the lamp 7.

Resting on the upper edge of the refractor 9 is an upper clamp and reflector hinge ring 32, as shown most clearly in FIGS. 2 and 6. A gasket 33, preferably of a suitable water-repellant material similar to gasket 29, is disposed between the ring 32 and the refractor 9.

Three radially inwardly projected lugs 34 are equi-circumferentially distributed about the ring 32 in alignment with corresponding lugs 35 on the lower mounting ring 26. The lower mounting lugs 35 are tapped to receive three clamp rods 36 which extend upwardly from the lugs 35 and through suitable openings in the lugs 34. Wing nuts 37 thread on to the upper end of the clamp rods 36 which are suitably threaded and, when tightened down, clamp the refractor 9 in position. To remove the refractor 9, the wing nuts 37 are readily removed such that the refractor may be lifted from the base portion 8.

The dished reflector 10 is releasably hinged to the hinge ring 32 to overlie the upper end of the refractor 9 in vertically spaced relation to the ring 32 and refractor 9. The reflector 10 opens downwardly and extends substantially radially outwardly of the refractor 9. The lower edge of the reflector is disposed slightly below of the plane of the upper edge of the refractor.

The reflector 10 is secured to the hinge ring 32 in the illustrated embodiment of the invention in the following manner.

Referring particularly to FIGS. 2 and 6–8, a pair of hinge arms 38 are secured to the inner surface of the reflector 10 on an arc which is slightly outwardly of the vertical projection of the upper edge of the refractor 9. The hinge arms 38 are secured to the reflector by a pair of cap screws 39 which pass downwardly through the reflector and thread into suitably tapped openings in laterally extending mounting flanges or lugs 40. The hinge arms 38 extend downwardly toward the outer circumference of the upper edge of the refractor 9 and the mounting ring 32 and terminate in horizontally apertured ends.

The mounting ring 32 is provided with a pair of integral bifurcated lugs 41, which depend downwardly and outwardly and which are circumferentially spaced in accordance with the spacing of the hinge arms 38. The lugs 41 are horizontally apertured to align with the apertures in the terminating ends of the hinge arms 38. Pins 42 pass through the aligned openings in arms 38 and lugs 40 to pivotally secure the reflector 10 to the ring 32 and to support the reflector in vertically spaced relation to the refractor 9.

A latch arm 43 is secured to the inner surface of the reflector 10 by suitable cap screws 44 on a line bisecting the two hinge arms 38 and adjacent the opposite side of the refractor 9. The latch arm 43 extends vertically downwardly and terminates in a lower hook portion which is adapted to receive a standard spring-loaded lever 45 for securing the reflector 10 to the hinge ring 32. Lever 45 is pivotally secured by a pin 46 to a bifurcated lug 47 which is integrally formed on the mounting ring 32 in alignment with latch arm 43.

The latch arm 43 and spring-loaded lever 45 releasably latch the reflector 10 to ring 32 overlying the refractor 9 and allow ready servicing of the assembly. For example, referring to FIG. 9 in the drawings, to service the luminaire 1 the latch lever 45 is released and the reflector 10 swung to the vertical position partially shown in FIG. 9 to permit ready and immediate access to the internal components of luminaire 1.

Referring particularly to FIGS. 1, 2, 10 and 11, the illustrated reflector 10 is a dish-shaped, downwardly opening metallic member which may be formed of any suitable material such as aluminum or the like. The reflector includes a main central portion having a preselected radius and an outer peripheral portion of a different radius to form a pleasing dish-shaped configuration which can effectively reflect the upward directed light. The reflector 10 preferably terminates in a horizontal plane above or coincident with the uppermost plane of the refracted light from refractor 9 and does not therefore intercept any of the refracted light.

Spun aluminum provides a particularly decorative unit having good reflecting properties such that no special reflecting surface material or member need by secured to the inner surface of reflector 10. Such a separate reflecting surface may of course be supplied, if necessary or desired.

The hinge arms 38 and latch arm 43 are selected to vertically spaced reflector 10 for the most efficient light distribution. The reflector 10 serves to redirect all of the upwardly directed light from lamp bulb 7 downwardly toward the horizontal. Consequently, there is no wasted light and very good utilization and high candle power results.

Referring particularly to FIGS. 10 and 11, the reflector 10 includes a series of circumferential or circular flutes 48. The flutes 48 constitute a series of steps in the reflector 10 which are located generally centrally of the radius of the reflector in the illustrated embodiment of the invention. The illustrated circular flutes 48 are designed with the top outer edge of each individual flute or step terminating on the line constituting the radius of the upper portion of the reflector 10 to maintain aesthetic appearance of the reflector 10. The angle of the circular flutes 48 is selected to reflect the light at different angles and thereby distribute this upward directed light evenly through the illuminated area. The pitch of the outer flutes 48 are designed to reflect the light below the lower outer edge of reflector 10 and thereby insure complete utilization of the light from lamp 7. The flutes should begin where the light passing through the top opening of refractor 9 is reflected downwardly and exteriorly of the refractor and terminate where the outermost of this upward emitted light passes over the inside diameter of the refractor. The light passing through the refractor 9 is controlled by the prismatic section 30. The circular flutes 48 are thus located to evenly distribute all of the upward directed light and prevent any establishment of a bright ring in the illuminated area. The reflector 10 thus serves to reflect the upward light from lamp bulb 7 over the top of the refractor 9 and then into angles below the horizontal to establish a very even light pattern.

As previously described, the light passing through the refractor 9 is distributed in accordance with the design of the prismatic section 30 which bends the light to give the desired illumination. Practically, the angles of the individual projections of the prismatic section 30 is limited and a small amount of light may pass therethrough. The reflector 10 does also intercept this latter light and direct it downwardly to maintain complete utilization of the light.

In the illustrated embodiment of the invention, the circular flutes extend into the area of the attachment of the cap screws 39 and 44 and the hinge arms 38 of the latch arm 43. Small flat areas 49, as most clearly shown in FIG. 10, are provided to allow seating of the arms and attachment screws onto the adjacent surfaces of the reflector 10.

A cylindrical screen 50 is secured to the reflector 10 and extends vertically between the inner surface of reflector 10 and the upper surface of the hinge ring 32 and refractor 9 to substantially close off the opening between the reflector 10 and the refractor 9. The screen 50 allows free movement of air and light from the luminaire while preventing birds and other large foreign elements from entering into the luminaire 1.

The illustrated circular screen 50 is secured to the reflector 10 for simultaneous movement as shown in FIGS. 2, 7 and 8 therewith in the following manner.

Rod-like projections 51 are secured to central portion of the arms 38 and 43 extending generally diametrically of the reflector 10. The projections 51 terminate in pointed heads 52 which are adapted to project through the screen 50 and securely hold the screen in place. Screen 50 thus moves simultaneously with the reflector 10.

As previously noted, a photoelectric control 20 is mounted within the top center of reflector 10. Referring particularly to FIGS. 1, 2, 12 and 13, the illustrated photoelectric control 20 includes a standard photo responsive cell 53 such as a cadmium sulphide cell. The cell 53 is connected by control lines 21 in circuit with power lines 18 and the lamp bulb 7 to normally automatically turn the light on at dusk and off at dawn.

The photo responsive cell 53 is secured within an annular mounting bracket 54 for releasable attachment to the reflector 10 and control lines 21 extend from the cell 53 downwardly adjacent the hinge arms 38 to the lamp socket 6. Lead clamping bands 55 secure the lines 21 to one of the clamping rods 36 to prevent contact of the lines with the hot lamp bulb 7. The lines 21 are secured to the rod 36 adjacent the hinge arms 38 and consequently they move in the direction of pivotal movement of the reflector 10 to open the luminaire 1 and do not interfere with the movement of the reflector.

Mounting bracket 54 includes an outer lip 56 partially closing the upper end of the mounting bracket and forming a shoulder against which cell 53 is clamped. A U-shaped clamp 57 is secured to the underside of the bracket 54 by small cap screws 58 and securely clamps the cell 53 in bearing engagement against the lip 56. The small cap screws 58 pass through suitable openings in the clamp 57 and thread into correspondingly tapped openings in the mounting bracket 54.

The photoelectric control 20 is secured within a central opening 59 defined by an upwardly flared portion 60 of the reflector 10 with the cell 53 and clamp 57 extending downwardly through the opening and with the mounting bracket 54 extending radially over the opening. A sealing flange 61 is integrally formed on the lower edge of the mounting bracket 54 and an O-ring 62 is disposed between the sealing flange 61 and the flared portion 60 to seal the opening 59 with the photoelectric control 20 mounted in position.

A pair of oppositely disposed clamping bolts 63 extend downwardly through the mounting bracket 54 and thread into suitably tapped apertures in a clamping plate 64 arranged within reflector 10. Plate 64 includes a central opening 65 which allows the inner portion of the mounting clamp 57 and the cell 53 to pass therethrough and to allow the plate to move into clamping engagement with the flared portion of the reflector 10. The clamping bolts 63 are drawn up to pull plate 64 into engagement with an inner surface of flared portion 60 and the mounting bracket 54 downwardly into sealing and supporting engagement with the outer surface of the flared portion 60.

The photo electric control unit 20 is thus mounted for the most advantageous orienting of the control with respect to the solar light pattern and is further readily replaced and serviced. The top central location of the control unit also permits construction of a neat and pleasantly appearing luminaire 1.

The assembly and functioning of the embodiment of the invention illustrated in FIGS. 1–13 is summarized in the following manner.

When the bulb 7 is lit, the emitted light principally extends in the horizontal and vertically upward direction. The horizontally directed light is redirected through the prismatic refractor 9 in accordance with a predetermined light pattern. The light which is directed upwardly is reflected by the reflector 10 downward toward the horizontal.

The reflector 10 redirects any stray upward light from the upper prisms of the refractor 9 downwardly into the area to be illuminated. The reflector 10 also constitutes a light diffusing member to provide a high, even light level. The circular or circumferential flutes 48 prevent establishment of bright rings within the illuminated area and maintain the even distribution of the light.

The reflector 10 further constitutes a protective hood over the refractor 9 and the bulb 7 to prevent damage to the elements and prevent accumulation of falling matter within luminaire 1.

During the operation of the luminaire 1, the temperature of the refractor 9 increases substantially and contact with cold rain and the like often breaks the refractor.

In the illustrated embodiment of the invention, the lower vertical slots 15 in the adaptor 5 and the opening covered by screen 50 between the reflector 10 and the upper end of the refractor 9 allows air to rise upwardly through the luminaire to continuously pass cooling air over the refractor 9 and to reduce the temperature of the refractor. The air passes upwardly through the luminaire 1 due to the chimney effect of the tubular construction of the luminaire. Thus the hot air within the luminaire rises and draws cool air upwardly through the lower vertical slots 15.

Small insects, not shown, which are attracted to the luminaire 1 and enter through the screen 50 are destroyed by the heat within the luminaire 1. The vertical slots 15 in the adaptor 5 allow the insects to fall outwardly from the luminaire 1 and prevent the buildup of insects within the luminaire itself. Consequently, the luminaire 1 need not be periodically disassembled to remove insects and other foreign matter.

The illustrated embodiment of the invention is particularly adapted to convenient servicing. The reflector 10 and screen 50 are readily swung open to allow immediate entrance into the luminaire 1 for replacement of the lamp and similar servicing functions.

If the refractor 9 is to be removed for any reason, the wing nuts 37 are easily and quickly removed from the clamping rods 36 such that the mounting ring 32 and attached reflector 10 can be lifted as a unit from the upper end of the refractor 9 which is then free to be removed from the assembly.

Thus the present invention provides an efficient and practical post top mounted luminaire including a light controlling optical system to provide a large area with an even level of light.

The embodiment of the invention illustrated in FIGS. 1–13 is typical of installations employing vertical poles which terminate in a relatively small diameter, normally three inches. Referring to FIGS. 14 and 15, an embodiment of the invention is illustrated for mounting of the luminaire 1 upon a relatively large diameter vertical pole, normally of the order of seven inches. Corresponding elements in the two embodiments are given corresponding numbers in the drawings for purposes of simplicity and clarity of explanation. The illustrated embodiments differ in construction only in the adaptor 5 and base 8 and no further description of the elements previously described is given except where necessary to fully and clearly explain the embodiment shown in FIGS. 14 and 15.
hdwa Referring particularly to FIGS. 14 and 15, a mounting pole 66 is shown terminating in a relative large diameter. An adaptor 67 is secured to the upper end of the pole 66 and a base 68 is secured to the adaptor 67. The lamp socket 6, bulb 7, refractor 9 and the like are mounted in place generally in the same manner as that of the previous embodiment described.

The adaptor 67 however is a ring member which is telescoped over pole 66 and includes a series of inwardly projecting arms 69 which are adapted to rest upon the upper edge of the pole 66. Four equicircumferentially distributed locking screws 70 pass horizontally through the adaptor 67 and bear on the adjacent surface of pole 66 to rigidly interlock the luminaire 1 in place.

The adaptor's inner diameter is greater than the pole's outer adjacent diameter to define an encircling slot 71 which is only interrupted by locking screws 70.

The base 68 is generally similar to base 8 of the previous embodiment. The defining wall of base 68 however rises relatively straight upwardly from adaptor 67 rather than rising upwardly and outwardly to the pronounced degree of base 8.

The embodiment of the invention illustrated in FIGS. 14 and 15 functions in the same manner as the previous embodiment. The slot 71 permits air to rise upwardly through the luminaire to cool the refractor 9 and allows insects, not shown, and the like to drop from the luminaire.

Referring to FIG. 16 in the drawings, a fragmentary side elevational view of luminaire 1 having a reflector 72 constructed in accordance with another aspect of the present invention is illustrated. The other components of the luminaire may be constructed in accordance with the previous embodiments and no further description thereof is given.

The reflector 72 is also slightly dish-shaped and includes a substantially flat central portion 73 and a curved peripheral portion 74. The central portion 73 is sufficiently great to reflect all of the light emitted upwardly through the upper end of the refractor. The generally flat central portion eliminates the necessity for flutes or other means of preventing a bright ring within the illumination pattern.

The adaptor, base and mounting ring are illustrated as individual members because of adaptability to manufacturing. They may however be cast as a single integral assembly and such integral construction is included in defining one member secured to another in the present application.

The present invention provides a modern appearing post top lighting unit having excellent light control which establishes a high degree of evenness in the light level in the area being illuminated. The lighting unit of this invention is well protected against damage or interference from foreign elements such as birds, insects and rain. The lighting unit is easily and quickly opened for bulb replacement and similar service requirement.

Various modes of carrying out the invention are contemplated as being within the scope of the following claims particularly pointing out and distinctly claiming the subject matter which is regarded as the invention.

I claim:

1. A post top lighting unit for mounting a vertically aligned lamp and lamp socket upon a vertical pole, which comprises an adaptor releasably securable to the top of the pole with an encircling vertical passage exteriorly of the pole to allow movement of matter into and from the lighting unit, a tubular base joined to the adaptor and extending upwardly and outwardly to enclose the lamp socket, a ring-like refractor open at opposite ends mounted upon the upper end of the tubular metallic base to encircle the lamp and having an upper annular prismatic section to direct the generally horizontally emitted light downwardly, an inverted dished reflector attached to the top of the refractor and supported in vertically spaced relation to top of the refractor, said reflector extending radially and downwardly of the refractor with the lower edge of the reflector above the horizontally directed light from the refractor to evenly distribute the upwardly directed light downwardly within the illumination pattern established by the refractor, and screen extending between the top of the refractor and the reflector to substantially close the opening therebetween, said vertical passage and the opening covered by said screen establishing a chimney action to move air upwardly across the surface of the refractor and serving to discharge insects and foreign matter.

2. A post top lighting unit for mounting a lamp and lamp socket upon the upper end of a pole, which comprises a post top adaptor securable in telescoped relation to the upper end of the pole and having a circular supporting wall concentric with the pole, a tubular base having an open top and bottom secured to the circular supporting wall, said adaptor establishing a series of vertical openings from within the base and exteriorly of the pole, a clamping means joined to the base and having an annular supporting surface, a tubular refractor having an open top and bottom mounted upon the annular supporting surface of the clamping means, a clamping ring mounted upon the upper edge of the refractor, releasable connecting means secured to the said clamping means and said clamping ring interiorly of the lighting unit to positively hold the refractor in place, a dish-shaped reflector having a diameter substantially greater than said refractor and mounted in vertically spaced relation to the upper end of the refractor with the lowermost edge of the reflector disposed above the horizontally and downwardly directed light from the refractor, an annular screen secured extending from the upper edge of the refractor to the reflector, hinge means secured to the second clamping ring and pivotally mounting the reflector, and latch means for releasably latching the reflector to the refractor.

3. A post top lighting unit including, an arcuate supporting wall, a tubular base having an open top and bottom secured to the arcuate supporting wall, the interior portion of said arcuate supporting wall having a series of vertical passages extending from the interior of said base through said arcuate supporting wall, a first clamping ring means on the upper end of the base and extending radially inwardly of the base, the inwardly extending portion of the clamping ring including an upstanding annular projection, a tubular refractor having a lower end adapted to fit over the upstanding annular projection and extending vertically upwardly from the base, a second clamping ring mounted upon the upper edge of the refractor, circumferentially distributed rod-like members secured to the lower clamping ring internally of the refractor and extending upwardly through the refractor, means to releasably secure the members to the upper mounting rings to clamp the refractor in place, sealing gaskets disposed between the ends of the refractor and the adjacent mounting rings, a dish-shaped reflector having a diameter substantially greater than said refractor, hinge means secured to the second clamping ring adjacent one of the rod-like members and to the reflector, a latch releasably secured to the second clamping ring and the reflector opposite the hinge means, said hinge means and latch supporting said reflector coaxially and vertically spaced from the upper end of the refractor with the outer edge of the reflector arranged below the upper end of the refractor, a tubular screen secured to the hinge means for movement with said reflector and aligned with said refractor, said screen extending from the upper edge of the refractor to the reflector in the latched position of the reflector, a photoelectric control mounted within a central opening in the top of the reflector, control leads secured to the photoelectric control and extending downwardly through the refractor and the base for connection to the lamp socket, and means to secure the leads to rod-like members adjacent the hinge means to allow pivotal movement of the reflector.

4. A post top lighting unit including, post top engaging adaptor means having internally extending lug means for vertical positioning thereof, a tubular base portion projecting upwardly from said adaptor means and terminating in an open top, said base portion including a first clamping ring on the upper end thereof, a tubular refractor having an open top and bottom mounted on said clamping ring, a lamp socket and support therefore mounted within said base, an upper clamping ring disposed upon the upper edge of the refractor, means interconnecting said clamping rings to positively hold the refractor in place, a reflector mounted overlying said refractor and having a diameter greater than the open top of said refractor, hinge means having a first member secured to said upper clamping ring and a second member secured to said reflector inwardly of the outer edge of the reflector, and releasable attachment means secured to said upper clamping ring and to the adjacent portion of said reflector to releasably hold the reflector overlying the refractor.

5. A pole top mounted lighting unit including, an adaptor having a post top engaging means and at least one opening exteriorly of said means to allow movement of matter into and from the lighting unit, a tubular metallic base secured to the adaptor, a ring-like refractor open at opposite ends mounted upon the upper end of the tubular metallic base, a dished reflector pivotally mounted to the top of the refractor for pivotal movement about a horizontal axis, said reflector being normally supported in spaced relation to the top of the refractor, said reflector having a downwardly concave central portion having a large radius and an outer peripheral curved portion having a different center than said central portion and a substantially smaller radius of curvature, the central portion of said reflector overlying at least as large an area as the light directed upwardly through the upper end of the refractor into interception with the reflector, and a series of circumferential flutes within said central portion in alignment with the light directed upwardly through the upper end of the refractor, said flutes being adapted to evenly distribute the light downwardly and exteriorly of the refractor.

6. A post top lighting unit including, pole top engaging adaptor means having an arcuate supporting wall, stop means extending generally inwardly from said supporting wall to vertically position said unit, a tubular base portion secured to the arcuate supporting wall and being open at its upper and lower ends, said base portion including a first clamping means on its upper end, a tubular refractor having a lower end engaging said first clamping means and extending upwardly therefrom, a second clamping means engaging the upper end of said refractor, a plurality of elongate support means secured in spaced relation to said base portion and extending upwardly therefrom and internally of said refractor to releasably engage said second clamping means to support the latter against upward movement in spaced relation above said first clamping means and to releasably secure said refractor therebetween, a dish-shaped reflector having a diameter substantially greater than said refractor, hinge means secured to said second clamping means and to one side of said reflector to pivotally support said reflector on said second clamping member, and releasable attachment means engaging the second clamping member and the reflector opposite said hinge means to hold said reflector in an unpivoted position.

7. A post top lighting unit having pole top engaging adaptor means, a tubular base portion having an open top and bottom secured to the adaptor, said base portion including a first clamping ring means on its upper end, a tubular refractor having a lower end engaging said first clamping ring means and extending upwardly therefrom, a second clamping means engaging the upper end of said refractor, a dish-shaped reflector having a diameter substantially greater than said refractor, hinge means secured to said second clamping member and to one side of said reflector to pivotally support said reflector on said second clamping means, and releasable attachment means engaging said second clamping means and the opposite side of said reflector, and elongate means releasably engaging said base portion and extending upwardly therefrom internally of said refractor and releasably engaging said second clamping ring means to releasably secure said refractor therebetween and to prevent upward movement of said reflector.

8. A post top lighting unit including pole top engaging adaptor means, a tubular base having an open top and bottom secured to the adaptor means, a first clamping ring on the upper end of the base, a tubular refractor having a lower end engaging said first clamping ring and extending upwardly therefrom, a second clamping ring engaging the upper end of said refractor, a dish-shaped reflector having a diameter substantially greater than said refractor, hinge means secured to said second clamping ring and adjacent one side of said reflector to pivotally support said reflector on said second clamping ring, and releasable attachment means engaging said second clamping ring and the reflector opposite said hinge means to hold said reflector in an unpivoted position, and a plurality of elongate support members extending in a substantially vertical direction and being connected at their lower ends to said first clamping ring and extending upwardly therefrom and internally of said refractor to releasably engage said second clamping ring to positively prevent upward movement of the reflector and to releasably secure said refractor between said clamping rings.

9. A post top lighting unit including pole top engaging adaptor means having an arcuate supporting wall, a tubular base having an open top and bottom secured to the arcuate supporting wall, a first clamping means on the upper end of the base, a tubular refractor having a lower end engaging said clamping means and extending upwardly therefrom, a second clamping means engaging the upper end of said refractor, a dish-shaped reflector having a diameter substantially greater than said refractor, hinge means secured to said second clamping member and to one side of said reflector to pivotally support said reflector on said second clamping member, releasable attachment means engaging said second clamping member and the opposite side of said reflector, means releasably engaging said first and second clamping means internally of said refractor and extending upwardly therethrough to prevent upward movement of the reflector and to releasably secure said refractor therebetween, a photoelectric control mounted within a central opening in the top of said reflector, control means secured to the control and extending downwardly through said refractor and to the base for connection to the lamp socket, and means for securing said leads to the second clamp member adjacent said attachment means to allow pivotal movement of said reflector.

10. A post top lighting unit including, post top engaging adaptor means, a tubular base portion attached to said post top adaptor means and having an open top and bottom, said base portion including a first refractor ring on its upper end, a tubular refractor having a lower end engaging said first refractor ring and extending generally upward therefrom, a second refractor ring engaging the upper edge of said refractor, an inverted dished reflector having a diameter greater than the diameter of said refractor, releasable attachment means for mounting said reflector on said second refractor ring, a plurality of spaced apart rod-like members coupled to said base portion and extending upwardly through the interior of said refractor to releasably engage said second refractor ring to clamp the refractor in place and to prevent upward movement of said reflector.

11. A post top lighting unit including post top engaging adaptor means, a tubular base portion attached to said adaptor means, said base portion including a first support means on its upper end, tubular refractor means having a lower end engaging said first support means and extending generally upwardly therefrom, a second support means adjacent the upper edge of said refractor, an inverted dished hood having a marginal edge extending in a generally horizontal direction beyond the edge of said refractor, a plurality of spaced apart elongate members coupled to said base portion and extending upwardly therefrom and engaging said second support means to form therewith hood support means, hinge means secured to said hood support means and to one side of said hood to pivotally mount said hood on said hood support means, and fastening means engaging said hood support means and said hood in generally horizontally spaced relation from said hinge means and holding said hood in its closed position.

References Cited in the file of this patent

UNITED STATES PATENTS

| | | |
|---|---|---|
| 1,622,272 | Benjamin | Mar. 29, 1927 |
| 1,737,027 | Schoonmaker | Nov. 26, 1929 |
| 1,900,330 | Chartrand | Mar. 7, 1933 |

(Other references on following page)

UNITED STATES PATENTS

| | | |
|---|---|---|
| 2,017,716 | Halvorson | Oct. 15, 1935 |
| 2,033,387 | Michel et al. | Mar. 10, 1936 |
| 2,164,546 | Rolph | July 4, 1939 |
| 2,185,694 | Noe | Jan. 2, 1940 |
| 2,267,669 | Robinson | Dec. 23, 1941 |
| 2,269,165 | Rutledge | Jan. 6, 1942 |
| 2,344,221 | Trautner | Mar. 14, 1944 |
| 2,383,116 | Elg | Aug. 21, 1945 |
| 2,489,076 | Bjontegard | Nov. 22, 1949 |
| 2,566,126 | Franck | Aug. 28, 1951 |
| 2,641,687 | Akely | June 9, 1953 |
| 2,881,306 | Sherron | Apr. 7, 1959 |
| 2,886,698 | Dorman | May 12, 1959 |
| 2,974,219 | Husby | Mar. 7, 1961 |

FOREIGN PATENTS

| | | |
|---|---|---|
| 55,003 | Germany | Jan. 7, 1890 |
| 542,017 | Belgium | Oct. 31, 1955 |

OTHER REFERENCES

Laurick: Germany, H16889VIIIc/2if, Jan. 12, 1956.